(12) United States Patent
Luehrs

(10) Patent No.: US 11,593,060 B2
(45) Date of Patent: Feb. 28, 2023

(54) DEVICES, METHODS, AND USER INTERFACES FOR FACILITATING TIME-SHIFTED BROADCAST PROGRAM RECORDING AND PLAYBACK

(71) Applicant: Douglas Richard Luehrs, Cherry Hill, NJ (US)

(72) Inventor: Douglas Richard Luehrs, Cherry Hill, NJ (US)

(73) Assignee: Anabac, LLC, Cherry Hill, NJ (US)

( * ) Notice: Subject to any disclaimer, the term of this patent is extended or adjusted under 35 U.S.C. 154(b) by 0 days.

(21) Appl. No.: 17/080,498

(22) Filed: Oct. 26, 2020

(65) Prior Publication Data

US 2021/0109701 A1   Apr. 15, 2021

Related U.S. Application Data

(63) Continuation of application No. 15/630,774, filed on Jun. 22, 2017, now Pat. No. 10,817,247.

(60) Provisional application No. 62/353,206, filed on Jun. 22, 2016.

(51) Int. Cl.
| | | |
|---|---|---|
| *G06F 17/00* | (2019.01) | |
| *G06F 3/16* | (2006.01) | |
| *G06F 16/60* | (2019.01) | |
| *H04H 20/40* | (2008.01) | |
| *H04N 21/4784* | (2011.01) | |
| *H04N 21/472* | (2011.01) | |
| *H04H 60/13* | (2008.01) | |
| *H04N 21/81* | (2011.01) | |
| *G06Q 30/0241* | (2023.01) | |
| *H04H 20/71* | (2008.01) | |
| *H04H 40/27* | (2008.01) | |

(52) U.S. Cl.
CPC ........... *G06F 3/165* (2013.01); *G06F 16/60* (2019.01); *G06Q 30/0241* (2013.01); *H04H 20/40* (2013.01); *H04H 20/71* (2013.01); *H04H 40/27* (2013.01); *H04H 60/13* (2013.01); *H04N 21/4784* (2013.01); *H04N 21/47217* (2013.01); *H04N 21/812* (2013.01)

(58) Field of Classification Search
CPC ... G06F 3/165; H04H 60/13; H04N 21/47217
USPC .................................................. 715/727, 203
See application file for complete search history.

(56) References Cited

U.S. PATENT DOCUMENTS

| | | | | |
|---|---|---|---|---|
| 7,454,166 B2 * | 11/2008 | Patsiokas | ............... | H04H 40/90 455/186.1 |
| 8,989,686 B2 * | 3/2015 | Strohmaier | ........... | H03J 1/0091 455/161.3 |

(Continued)

OTHER PUBLICATIONS

Aras, 'Personal Television Schedule Service', IBM Technical Disclosure Bulletin, vol. 39 No. 08 (Year: 1996).*

*Primary Examiner* — Stephen S Hong
*Assistant Examiner* — Matthew J Ludwig
(74) *Attorney, Agent, or Firm* — Jennifer Medlin

(57) ABSTRACT

Recorded broadcast programs, including advertisements, are selected for playback responsive to user input. The user input may include pressing a button multiple times to cause recorded programs to be scanned through for a particular preset channel from newest recorded to oldest recorded. Pressing another button multiple times causes the recorded programs to be scanned through for the particular present channel from oldest recorded to newest recorded.

9 Claims, 7 Drawing Sheets

(56) References Cited

U.S. PATENT DOCUMENTS

| | | | |
|---|---|---|---|
| 2002/0188944 A1* | 12/2002 | Noble | H04N 21/26241 |
| | | | 725/39 |
| 2003/0163811 A1* | 8/2003 | Luehrs | H04N 21/454 |
| | | | 725/25 |
| 2003/0163823 A1* | 8/2003 | Logan | H04N 21/4756 |
| | | | 725/89 |
| 2005/0000747 A1* | 1/2005 | Richlen | B62J 45/10 |
| | | | 180/219 |
| 2006/0112409 A1* | 5/2006 | Yoon | B60R 11/02 |
| | | | 725/75 |
| 2009/0300506 A1* | 12/2009 | Drucker | G06F 3/00 |
| | | | 715/738 |
| 2013/0132366 A1* | 5/2013 | Pieper | G06F 16/9535 |
| | | | 707/710 |
| 2013/0309986 A1* | 11/2013 | Cox | H04H 20/55 |
| | | | 455/179.1 |
| 2014/0078022 A1* | 3/2014 | Dusterhoff | G06F 3/1423 |
| | | | 345/3.1 |

\* cited by examiner

7:00AM AT TURN-ON

| PRESET | | PROGRAM NAME | ARTIST NAME | LISTENED TO | | STATION POINTS | EARNED 0.1 AD POINTS |
|---|---|---|---|---|---|---|---|
| L | 1 | 94.1 | PROGRAM NAME | ARTIST NAME | IN PROGRESS | 7:00AM | 7:00AM |
| | 2 | 102.1 | PROGRAM NAME | ARTIST NAME | IN PROGRESS | 7:00AM | |
| | 3 | 95.1 | PROGRAM NAME | ARTIST NAME | IN PROGRESS | 7:00AM | |
| | | | | | | | |
| | | | | | | | |
| | | | | | | | |

Fig. 2A

7:05AM AFTER 5 MIN

| PRESET | | PROGRAM NAME | ARTIST NAME | LISTENED TO | | STATION POINTS | +2 AD POINTS EARNED FOR 94.1 | EARNED 0.1 AD POINTS |
|---|---|---|---|---|---|---|---|---|
| L | 1 | 94.1 | PROGRAM NAME | ARTIST NAME | IN PROGRESS | 7:00AM | 7:05AM | 7:05AM |
| | 3 | 95.1 | PROGRAM NAME | ARTIST NAME | LOADED | 7:00AM | | |
| | 2 | 102.1 | PROGRAM NAME | ARTIST NAME | LOADED | 7:00AM | | |
| | 3 | 95.1 | PROGRAM NAME | ARTIST NAME | IN PROGRESS | 7:05AM | | |
| | 2 | 102.1 | PROGRAM NAME | ARTIST NAME | IN PROGRESS | 7:05AM | | |
| | | | | | | | | |

Fig. 2B

7:15AM AFTER 10 MIN USER SELECTS TO HEAR PROGRAM (FROM 7:00 ON 95.1)

TUNING AWAY FROM AD

| PRESET | | | | | STATION POINTS |
|---|---|---|---|---|---|
| L | 1 | 94.1 | PROGRAM NAME | ARTIST NAME | LISTENED TO | 7:00AM | +2 AD POINTS EARNED FOR 94.1 |
| L | 1 | 94.1 | PROGRAM NAME | ARTIST NAME | LISTENED TO | 7:05AM | +2 AD POINTS EARNED FOR 94.1 |
| | 1 | 94.1 | AD NAME | ADVERTISER | IN PROGRESS | 7:10AM | |
| L | 3 | 95.1 | PROGRAM NAME | ARTIST NAME | LOADED | 7:00AM | EARNED 0.1 AD POINTS FOR 95.1 |
| | 3 | 95.1 | PROGRAM NAME | ARTIST NAME | LOADED | 7:05AM | |
| | 3 | 95.1 | PROGRAM NAME | ARTIST NAME | IN PROGRESS | 7:10AM | |
| | 2 | 102.1 | PROGRAM NAME | ARTIST NAME | LOADED | 7:00AM | |
| | 2 | 102.1 | PROGRAM NAME | ARTIST NAME | LOADED | 7:05AM | |
| | 2 | 102.1 | PROGRAM NAME | ARTIST NAME | IN PROGRESS | 7:10AM | |
| | | | | | | | |
| | | | | | | | |

Fig. 2c

7:15AM AFTER 15 MIN USER SELECTS TO HEAR PROGRAM X (FROM 7:05 ON 95.1)

| | PRESET | | ARTIST NAME | LISTENED TO | | STATION POINTS |
|---|---|---|---|---|---|---|
| L | 1 | 94.1 PROGRAM NAME | ARTIST NAME | LISTENED TO | 7:00AM | +2 AD POINTS EARNED FOR 94.1 |
| L | 1 | 94.1 PROGRAM NAME | ARTIST NAME | LISTENED TO | 7:05AM | +2 AD POINTS EARNED FOR 94.1 |
| S | 1 | 94.1 AD NAME | ADVERTISER | LOADED | 7:10AM | |
| | 3 | 95.1 PROGRAM NAME | ARTIST NAME | LOADED | 7:00AM | +2 AD POINTS EARNED FOR 95.1 |
| L | 3 | 95.1 PROGRAM NAME | ARTIST NAME | LOADED | 7:05AM | EARNED 0.1 AD POINTS FOR 95.1 |
| | 3 | 95.1 PROGRAM NAME | ARTIST NAME | IN PROGRESS | 7:10AM | |
| | 1 | 94.1 PROGRAM NAME | ARTIST NAME | IN PROGRESS | 7:11AM | |
| | 2 | 102.1 PROGRAM NAME | ARTIST NAME | LOADED | 7:00AM | |
| | 2 | 102.1 PROGRAM NAME | ARTIST NAME | LOADED | 7:05AM | |
| | 2 | 102.1 PROGRAM NAME | ARTIST NAME | IN PROGRESS | 7:10AM | |

DEVICES, METHODS, AND USER INTERFACES FOR FACILITATING TIME-SHIFTED BROADCAST PROGRAM RECORDING AND PLAYBACK

CROSS-REFERENCE TO RELATED APPLICATIONS AND TECHNICAL FIELD

The present application is a continuation of U.S. patent application Ser. No. 15/630,774, now issued as U.S. patent Ser. No. 10/817,124, which claims priority to U.S. Provisional Application No. 62/353,206. The present invention relates to a broadcast recorder/player. More specifically, the present invention relates to a broadcast recorder/player and user interface for facilitating time-shifted broadcast program recording/playback and calculating ad play credit.

BACKGROUND

Radio broadcast recording devices exist that allow users to record radio broadcasts and play them back. However, such devices typically require the user to interact with a complicated interface to select audio programs for playback. For a user in an environment, such as a car, interaction with such a device may be dangerously distracting.

Also, such devices do not typically keep track of the amount of time that recorded programs or ads are played.

SUMMARY

The present embodiments relate to broadcast recording/playback devices, methods and user interfaces. Recorded broadcast programs, including advertisements, are selected for playback responsive to user input. The user input may include pressing a button multiple times to cause recorded broadcast programs to be scanned through for a particular preset channel from newest recorded to oldest recorded. Pressing another button multiple times causes the recorded programs to be scanned through for the particular preset channel from oldest recorded to newest recorded.

BRIEF DESCRIPTION OF SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s) in which:

FIGS. 2A-2D illustrate information that may be stored and displayed on a screen as part of recording and/or playback of programs and advertisements according to illustrative embodiments.

DETAILED DESCRIPTION

According to illustrative embodiment, devices, methods, and user interfaces are provided that enable time-shifted broadcast program recording and playback using existing broadcast waves, e.g., radio waves. The user interface is a simple interface that does not distract a user from other tasks, such as driving. Also, the device does not require a data service for simple time-shifted recording and playback.

As used herein, the term "broadcast program" is not limited to a radio broadcast program but may include any program delivered to a user from a content provider via a transmission, including but not limited to an over-the-air broadcast, a Wi-Fi transmission, a cellular transmission, or any other transmission method in which a content provider is making a program available to a user.

Figure 1A:
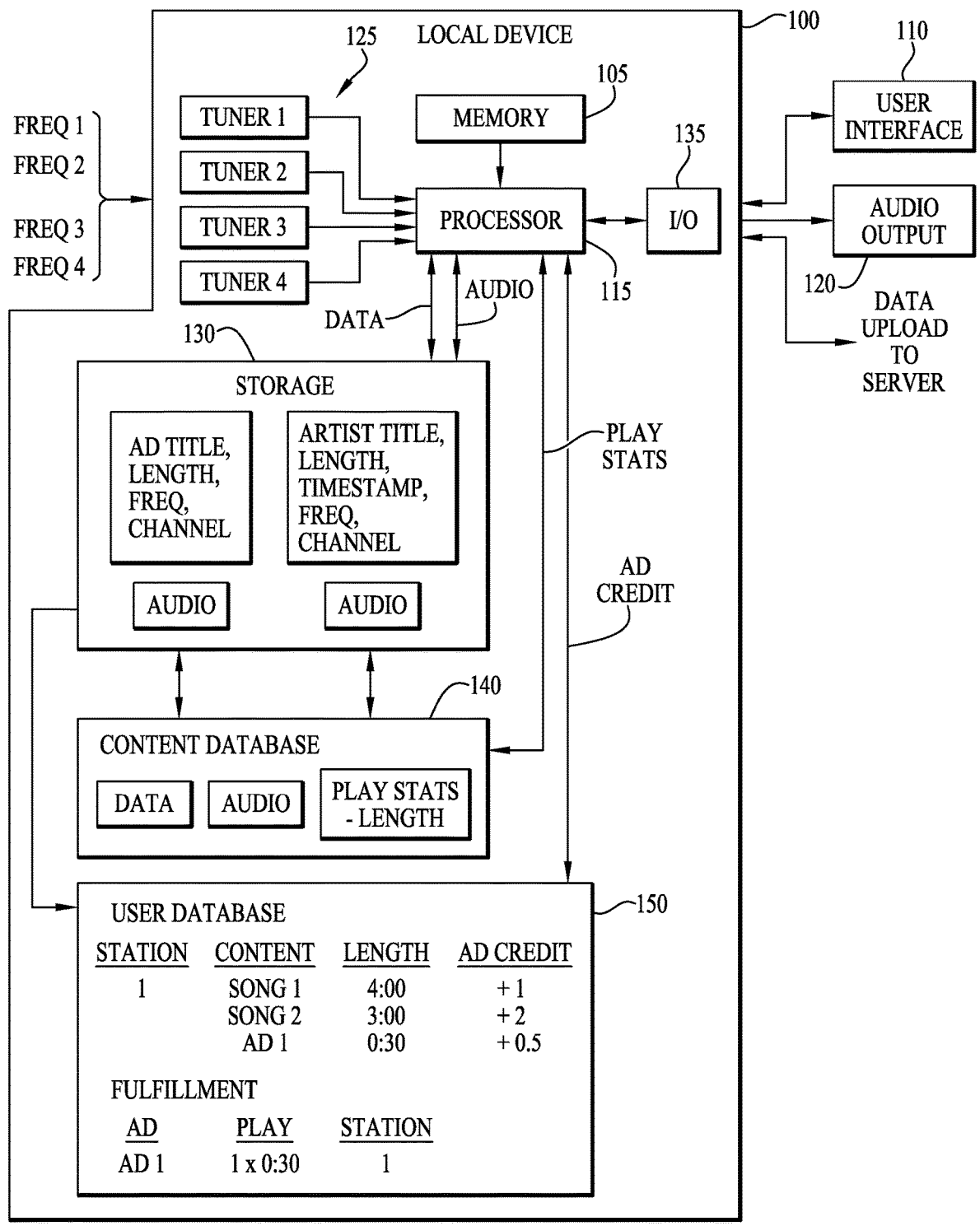
FIG. 1A illustrates a local broadcast program recording/playback device and a user interface according to illustrative embodiments.

FIG. 1A illustrates a local broadcast program recording and playback device and a user interface according to illustrative embodiments. The local recording/playback device 100 includes broadcast tuners 125, e.g., radio tuners, which are tuned to preset channels across which programs are broadcast from broadcast stations, e.g., radio stations. If no broadcasts are detected by a tuner, such as when the local device 100 has traveled out of range of the current preset channels, the tuners scan open airwaves. Scanning may start, e.g., from user specified search parameters, such as scan for high power stations, scan low frequencies to high, scan high to low frequencies, etc., until a tuner discovers the meta data from a broadcast program. Upon detection of such metadata, the metadata and the program are recorded by the local device 100.

Although multiple tuners 125 are shown in FIG. 1A for ease of illustration, it should be appreciated that the concepts described herein may be applicable to a single tuner. If a tuner discovers a broadcast program, a processor 115 will check to see if the program is already being recorded. If so, the processor 115 will cause the tuner to skip over that program and go on to look for the next one.

The scanning through channels and recording of metadata and program content may be facilitated by the processor 115 executing computer readable instructions stored in a memory 105 to perform a "scan and store" function. The metadata and the program content may be recorded into the same memory 105 as the computer readable instructions or in separate databases 130 and 140. For example, the metadata may include the program title, artist, album title, station recorded from, and timestamp of the recording and may be stored in the database 130. The program content may include, e.g., songs, talk shows, etc. and may be stored in the database 140.

The recorded metadata may be displayed via a display, e.g., a user interface (UI) screen. The UI screen may be included as part of the user interface 110 shown in FIG. 1A or may be a device that is separate from the user interface 110 but still in communication with the local device 100 via, e.g., an I/O interface component 135. The I/O component 135 may include one or more interfaces including an antenna or other suitable type of transceiver through which data and signals may be transmitted and received. For example, the I/O component 135 may be a hardwire connection, such as, for example, a USB, mini-USB, audio jack, PS2, IEEE 1394, serial, parallel, Ethernet (RJ48), RJ 11, or a component, such as an antenna, for enabling a wireless connection like WiFi, Bluetooth, and the like. The I/O component can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), voice to command interfaces (e.g., voice activated interfaces responsive to a voice command to skip back, skip forward), a combination thereof, and the like.

Responsive to input from a user via the user interface 110, the processor 115 causes recorded broadcast programs to be scanned through for playback. Selected programs may be played via an output, e.g., the audio output 120, which may include a speaker. The audio output 120 may be connected to the local device 100 via, e.g., the I/O interface 135.

According to one embodiment, the scan and store function that is executed by the processor 115 progresses until the user turns off the function. If the storage databases 130 and 140 of the local device 100 reach capacity, the databases will declare themselves full, and the processor 115 will cause recording to be stopped or will cause recording to occur over previously recorded programs. Recording over previously recorded programs may be subject to a prioritization configuration which may be random, preset, or user configurable.

Broadcast advertisements/commercials may also be recorded and cataloged. For every commercial and program played, the processor 115 may cause the play statistics, including the amount of time each program and advertisement is played, to be recorded. The play statistics may be stored in the content database 140. With the broadcast source (e.g., the radio station) tagged, such that the plays of broadcast programs and advertisements can be made available for monetization in conjunction with the broadcast source.

For example, if programs broadcast from a particular broadcast source are being played a number of times, those play statistics can be delivered to a central collection point or server 200 (shown in FIG. 1B) via the I/O component 135 and any suitable communications network, e.g., a Wi-Fi network, a cellular network, a telematics network, etc. The play statistics may be uploaded to the server 200 in real time or at predetermined intervals over a given duration. The predetermined intervals may be set by the service provider hosting the server 200 and/or by the local device 100.

According to an illustrative embodiment, the server 200 aggregates play statistics from a plurality of recording and playback devices and later delivers the play statistics to broadcast sources according to a business arrangement. Potentially the user, the artist or the parent company that provides this service can realize compensation in return for the play statistics.

Figure 1B:
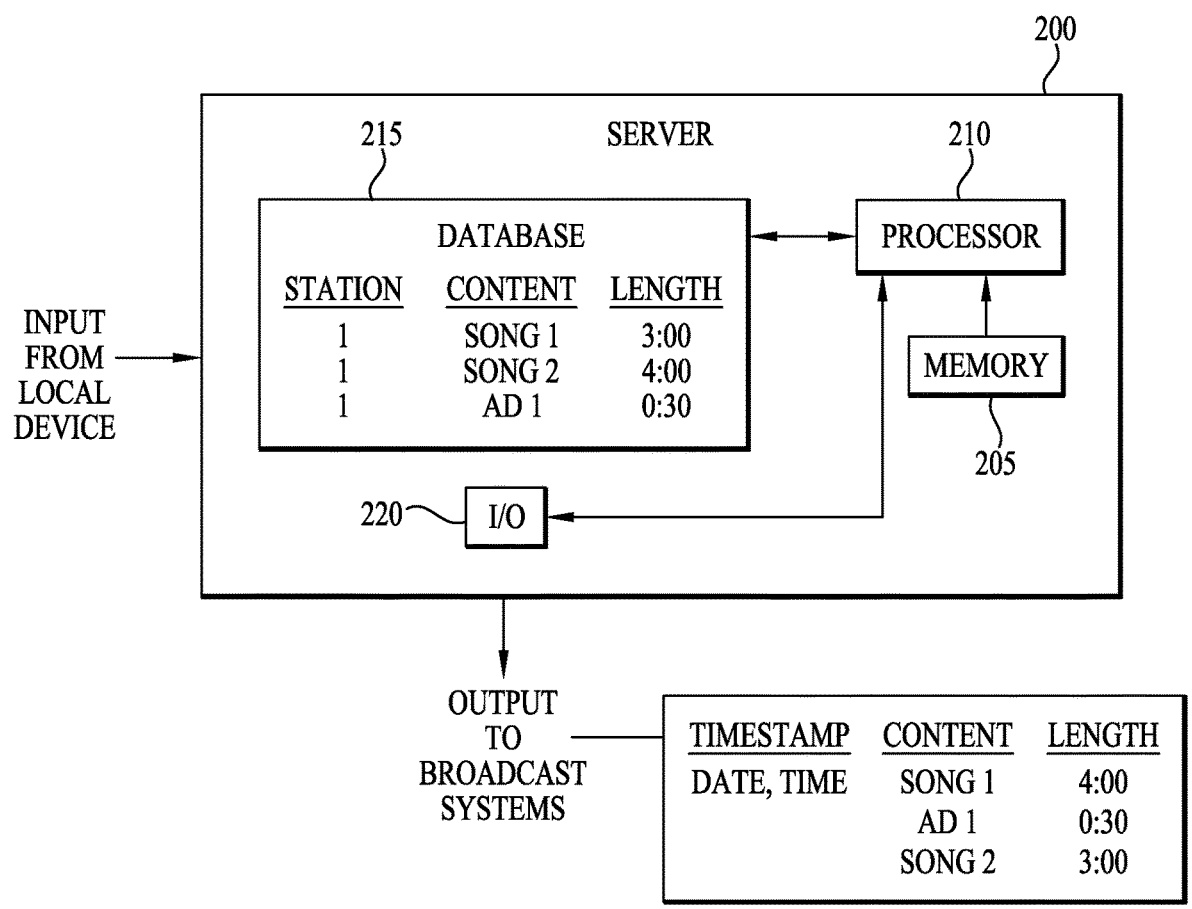
FIG. 1B illustrates a server for aggregating play statistics and providing the play statistics to broadcast stations according to illustrative embodiments.

Referring to FIG. 1B, uploading of play statistics to the server 200 may be implemented using a data service for Internet access. However, it should be appreciated that the local device 100 can be operated with or without Internet access. No Internet or data service is required for recording and playback. Internet access can enhance the user experience by allowing data look-ups and searching of digital libraries owned by or accessible to the user. The user can specify where the music library is located, and the local device 100 may fetch a user-specified program and store it on the local device 100, e.g., in the content database 140, at a user specified quality level.

The local device 100 can be set to "Wi-Fi mode", such that it can leverage Wi-Fi connections to perform data transfers that will upload play statistics to the server 200 via, e.g., the Internet, obtain instructions as to what ads to play after a certain number of songs have been reached from a certain station, and obtain other data according to business rules, e.g., obtain software updates, etc. The server 200 records all play statistics of programs, such as songs, and advertisements that are recorded and played back by the local device 100.

The server 200 also has an interface to broadcast stations, e.g., radio stations, to provide information as to how their content is being played as well as the ad plays. This information may be provided via a wireless connection, e.g., the Internet, a cellular network, etc.

For example, if three songs have been played from a certain radio station source, the broadcast source has "earned" the rights to play an advertisement, and these earned points are kept track of as ad points or credits. The ad credits may be stored in "ad bank" on the local device 100, (shown in the user database 150 in FIG. 1A).

When the advertisement is played, the playing of the advertisement will be recorded as a play statistic, and the play will be uploaded to the server 200. The server 200 may then interact with a broadcast server, e.g., a radio station server, to enable monetization of the advertisement. This closed loop will serve as a way for broadcast stations to give feedback to their advertisement buyers as well as a way for broadcast stations to know how often particular programs are being listened to, how programs rank in terms of popularity compared to other programs, etc. The interaction between the server 200 and the broadcast server may also allow for opportunities for engagement with users of social media and other data aggregation/user sharing experiences.

Referring again to the "ad bank" mentioned above, for every program a user listens to for a given broadcast station, ad points or credits get added to the "bank" for the station. It should be appreciated that an entire program need not be played back for ad points to be awarded. The user may listen to portions of multiple programs, and the processor 115 may calculate ad points to be added based on the amount of time of playback of the portions of the multiple programs.

In one embodiment, if a certain threshold of playback time is reached, the ad closest to the current time gets played and the fast forward/skip function gets locked. If the user "pays" for ad free listening, a business arrangement can be set such that revenue gets transferred to the broadcast station broadcasting the advertisements to compensate for skipping the ads.

According to an alternate embodiment, the broadcast station can provide rules and designate priorities for ads in metadata, such that certain ads are played at certain times of day, ads are played in a particular order, and incompatible ads are not played back-to back. Additionally, the broadcast station may set rules to specify certain ads to be played surrounding certain songs being played.

According to an illustrative embodiment, once an ad is played, ad points/credits are considered fulfilled and are tracked as such. Non-fulfilled ad points/credits stay in the ad bank waiting for the next opportunity for an ad to be played. The play statistics capture the programs that are played to earn an ad credit, the ad that is played to "cash in" or redeem the ad credit, the date and time stamps for ad plays and program plays to calculate duration, and the ad credits that would be reduced due to the fulfillment of an ad worth a certain "point value". The point value of the ad may be determined by the length of the ad.

If a user pays a subscription fee for ad free listening, a portion of the ad credits could be awarded to the broadcast station in lieu of the missed ad revenue.

In addition to keeping track of programs and ads played, the processor 115 in the local device 100 may keep track of genres of programs recorded and played. As programs are recorded, they may sorted as to genre, and this sorting may be recorded in the local device 100. Users can select a play sequence that matches the genre. Filters can be set up to exclude certain genres of programs. As programs get played, the local device 100 may perform genre banking, such that the recorded programs align as close as possible to particular genres.

To illustrate how the device 100 and the interface 110 may work, reference is now made to FIGS. 2A-2D which illustrate information that may be stored and displayed on a screen as part of recording and/or playback of programs and advertisements according to illustrative embodiments.

Referring to FIG. 2A, consider a user starting a car and turning on the radio at 7:00 am. As shown in FIG. 2A, the radio tuner starts at a current preset tuned frequency setting, e.g., preset channel 1 for the frequency 94.1, and looks for a program on that channel. If a program is playing on that channel, that program is recorded by the device as shown in FIG. 2A. The next program found on the next preset channel, channel 2 at the frequency 102.1, is also recorded in the order of the preset channel list, and so on. Along with the display of the preset channel number and frequency, the program name, artist name, indication of the progress of recording/listening and time of recording may be displayed.

Then, referring to FIG. 2B, assume that by 7:05 am, the user is still listening to a program on frequency 94.1. An indication that the program is being listened to may be displayed, and additional ad points earned are shown. As the tuner remains on frequency 94.1, and the program is being played, ad points are awarded.

Referring to FIG. 2C, assume that at 7:10 am, the user turns away from an ad playing on frequency and selects a program recorded at 7:00 am on preset channel 3 (frequency 95.1). The recorded program for that time on that preset channel is loaded. Ad points that are earned for loading the program may be displayed, along with an indication that the program is being listened to.

Then, referring to FIG. 2D, at 7:15 am, assume that the user selects a program recorded at 7:05 am on channel 3, and the recorded program for that time on that preset channel is loaded. Ad points that are earned for loading the program may be displayed, as well as an indication that the program is being listened to. Also, an indication that the ad was skipped when the user turned from channel 1 to channel 3 may be displayed.

As the user listens to the program, an indication that the program is being listened to may be displayed. If the program is still in progress, this may also be indicated on the display. Also, ad points earned for that station for tuning to that station may or may not be displayed. Ad points may be stored in the background and fulfilled in between programs as earned. If the ad points are displayed, users may skip certain stations to avoid having to redeem the ad points awarded to those stations by listening to ads.

The data shown in FIGS. 2A-2D may be displayed via a display screen that may be included as part of the user interface 110 shown in FIG. 1A. In a scenario in which the display is included in a vehicle, such as a car, the display may be made available only to those not in the driver seat when the vehicle is in motion. Alternatively, the display may be made available to the driver as well as passengers all the time. As yet another alternative, the display may be made available to a user in the driver seat only when the vehicle is in park. In addition, or as an alternative, the information shown FIGS. 2A-2D may be made available to a user via a device separate from the user interface 110, e.g., a mobile communication device, such as a smartphone, via a website. This may be facilitated by the local device 100 providing the data to a server hosting the website.

In addition to the data shown in FIGS. 2A-2D, according to another embodiment, there may be a "favorite/rewards meter" displayed which serves as an indicator for users to gain an appreciation for how much they like a broadcast station based on the program listening time from the broadcast stations that provided the programs. The favorites indicator may be shown as an icon that changes based on program playing time, like a flower growing as programs are played from a certain broadcast station. Once the favorite/rewards meter reaches a threshold, reward points may be awarded to the user which may be fulfilled via, e.g., give-aways or coupons from the broadcast station that broadcasts the favorite programs. According to this embodiment, the user would earn and could be shown loyalty points growing instead of ad points. Such loyalty points may be tracked and stored in a "loyalty" bank similar to the manner in which ad points are tracked and stored in an ad bank as described above.

According to one embodiment, if unfulfilled ad points remain in the ad bank for a certain duration, they may be automatically fulfilled. This scenario may arise, for example, if a user is driving through cities in which broadcast stations are located but the user never returns to those cities such that the ad points may be fulfilled. A threshold may be set, e.g., twice the threshold of playback time described above, such that if the cumulated total ad credits across all channels exceeds the threshold, the broadcast station with the most credits is awarded an ad play, and the earned credits are fulfilled rounding up.

As a user listens to programs, the plays of the programs are captured, and points are awarded to the broadcast station that broadcasts the played program. As the recordings grow for the preset channels, pressing preset channel buttons multiple times leads to skipping through the recorded programs. All of these play statistics may be captured and stored, e.g., locally in the device 100. When Wi-Fi, cellular, telematics or other data services are enabled, the statistics may be uploaded to the server 200.

The data stored for the recorded programs may include but is not limited to: oldest time stamp for a recorded program, programming of a particular genre, programs marked for deletion, programs that have the least number plays, programs that are detected to be poor quality or programs that are shortest in length. This data may be stored, for example, in the user database 150 of the local device 100

A user may decide to delete programs, and programs can be tagged such that they stay on the device and are not deleted. Programs can be tagged by the user as favorites, part of a playlist, given a number, or given a unique name. A user can also select to begin recording at a certain time and stop at a certain time. The user may also decide to follow a recording schedule, such as daily, Monday through Friday, certain days, etc. The recording schedule may be given a unique or device generated name.

For non-automobile applications, such as an application on a smart phone, the presentation to the user may be provided as a list that can be scrolled through or shown, such that the user can select the programs to play or select an order to play them in.

According to illustrative embodiments, a user can traverse through recorded programs and, rather than catching them in progress, can start playback of a program at the beginning of the segment. The user may choose to traverse through the programs recorded for a particular channel by pressing a preset button for that channel, e.g., the "1" button, multiple times on a user interface such as the user interface 300A shown in FIG. 3A. This causes the recorded programs in the queue for that preset channel to be skipped through or traversed. For example, pressing the "1" button once will cause one program to be traversed, pressing it again will cause the next program to be traversed, etc. The programs may be traversed from oldest recorded to newest recorded or from newest recorded to oldest recorded. The order in which the programs are traversed by pressing the preset channel buttons may be configured by the user and/or may be set by default by the device manufacturer.

In addition, or as an alternative, the user may press the scan/seek buttons to traverse through the entire queue of programs recorded for all the channels. For example, as shown in FIG. 3A, the user may press a "<se" button to traverse programs recorded from newest to oldest or may press an "ek>" button to traverse programs recorded from oldest to newest.

As yet another alternative, the user interface may include different buttons for each preset channel, and the user may press the buttons for a particular channel to traverse through recorded programs for that preset in different orders. For example, as shown in FIG. 3B, the user may press the "<1" button multiple times to scan through the recorded programs for that present channel going from the newest program to the oldest and/or may press the ">1" button multiple times to scan through the recorded programs for that preset channel going from the oldest to the newest. Similarly, there may be two buttons for each of the other preset channels, e.g., instead of "2" there may be "<2" and "2>", etc.

Figure 3A:
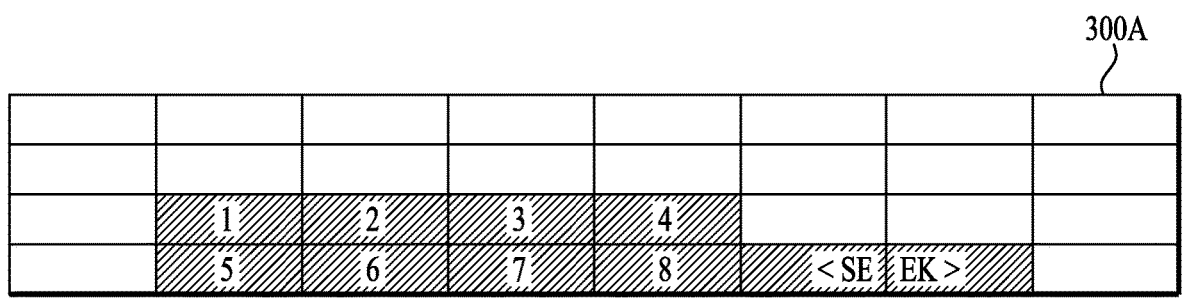
FIGS. 3A and 3B illustrate examples of user interfaces which may be used to scan through recorded broadcast programs for playback according to illustrative embodiments.
Figure 3B:
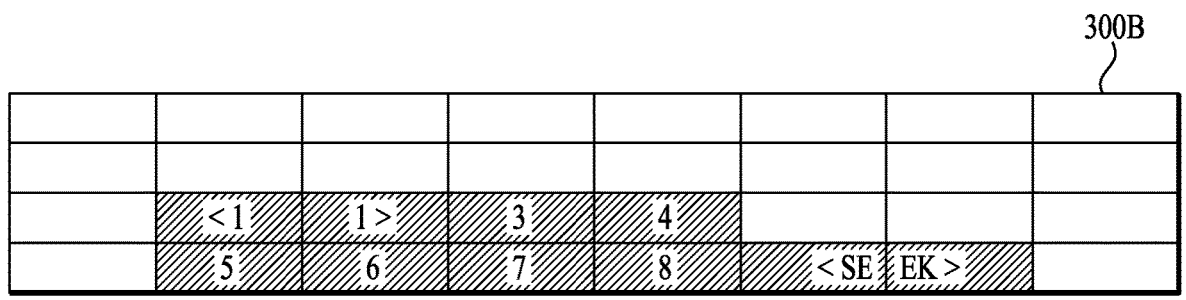

It should be appreciated that the buttons for the preset channels shown in FIG. 3A (and those shown on the user interface 300B in FIG. 3B) may be included in the user interface 110 shown in FIG. 1A. Alternatively, the buttons may be included in a separate user interface.

It should further be appreciated that "pressing" the preset channel buttons is not limited to the user physically touching the buttons on the user interface but may be facilitated, e.g., by voice activation or by any other suitable means.

Figure 4:
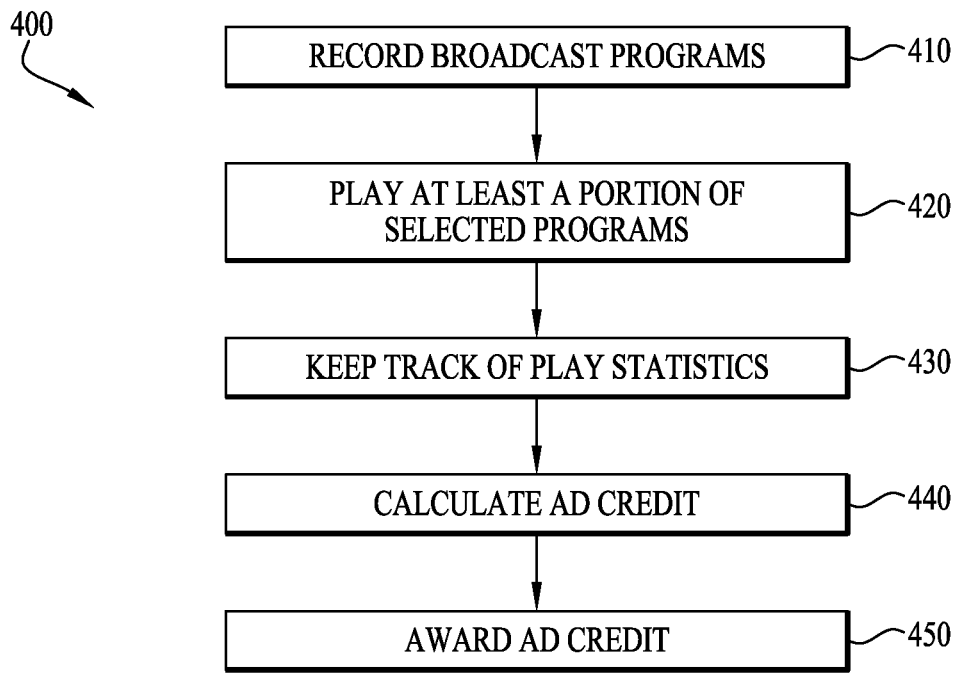
FIG. 4 is a flow chart illustrating steps involved in a process for providing time-shifted broadcast program recording and playback according to illustrative embodiments.
Figure 5:
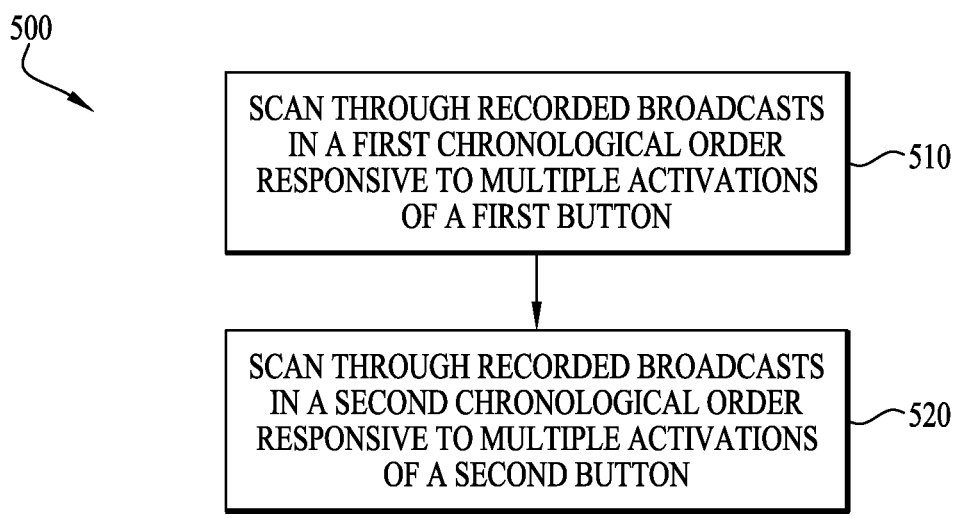
FIG. 5 is a flow chart illustrating steps involved in a process for scanning through recorded broadcast programs using a user interface.

FIGS. 4 and 5 are flow charts illustrating steps involved in a process 400 for providing time-shifted broadcast program recording and playback and a process 500 for operating a user interface of a broadcast program recording and playback device, respectively. It should be appreciated that the steps and order of steps described and illustrated are provided as examples. Fewer, additional, or alternative steps may also be involved, and/or some steps may occur in a different order.

Referring to FIG. 4, the process 400 begins step 410 at which programs broadcast by a broadcast station, including advertisements, are recorded by a device, such as the recording and playback device 100. At step 420, at least a portion of a selected recorded program is played for a particular amount of time responsive to commands received from a user via, e.g., a user interface 110. At step 430, play statistics including the amount of time the selected recorded program is played back are kept track of, e.g., by the processor 115 causing the play statistics to be stored locally in the recording and playback device 100. The play statistics may later be uploaded to a server, as described above. At step 440, an advertisement credit is calculated, e.g., by the processor 115, based on the amount of time the recorded program is played back. At step 450, the advertisement credit is rewarded, e.g., by the processor 115 providing the calculated advertisement credit to the user database 150. It should be appreciated that the steps shown in FIG. 4 may be repeated as multiple broadcast programs are recorded and selected for playback.

Referring FIG. 5, the process 500 includes step 510 at which a broadcast program recording and playback device is caused to scan through recorded broadcast programs in a first chronological order for a particular preset broadcast station responsive to multiple pushes of a first button on the user interface. This scanning may be initiated by the processor 115, responsive to pushes of the first button. The process further includes a step 520 at which the broadcast program recording and playback device is caused to scan through recorded broadcast programs in a second chronological order for the particular preset broadcast station responsive to multiple pushes of a second button on the user interface. This scanning may be initiated by the processor 115, responsive to pushes of the second button.

While the examples above are directed largely to recording and playback of radio broadcast programs, it should be appreciated that the invention is not limited to radio broadcast recording/playback but is applicable to any broadcast recording/playback, including, e.g., satellite broadcasts, internet broadcasts, etc. With the addition of a data service, podcast programs may also be recorded/played back in a similar manner.

While the various embodiments have been shown and described in example forms, it will be apparent to those skilled in the art that many modifications, additions, and deletions can be made therein without departing from the spirit and scope of the invention as defined by the following claims.

What is claimed is:

1. A system for a broadcast program and recording and playback device, the system comprising:
   a computer processor:
   the computer processor causing recording, when a tuner detects broadcast program, from a particular broadcast station of a plurality of particular broadcast stations, broadcast programs for the particular broadcast station and metadata including at least one timestamp for each of the recorded broadcast programs to generate a set of recorded broadcast programs for the particular broadcast station;
   a user interface comprising:
   a first button to cause the broadcast program recording and playback device to scan through the at least one timestamp of the set of recorded broadcast programs in a first chronological order for a first preset broadcast station from the plurality of particular broadcast stations, responsive to multiple activations of the first button;
   a second button to cause the broadcast program recording and playback device to scan through the at least one timestamp of the set of recorded broadcast programs in a second chronological order for the first preset broadcast station from the plurality of particular broadcast stations, responsive to multiple activations of the second button;

a third button to cause the broadcast program recording and playback device to scan through the at least one timestamp of the set of recorded broadcast programs in a first chronological order fora second preset broadcast station from the plurality of particular broadcast stations, responsive to multiple activations of the third button;

a fourth button to cause the broadcast program recording and playback device to scan through the at least one timestamp of the set of recorded broadcast programs in a second chronological order for the second preset broadcast station from the plurality of particular broadcast stations, responsive to multiple activations of the fourth button.

2. The system of claim 1, wherein the first chronological order is from newest to oldest, and the second chronological order is from oldest to newest.

3. The system of claim 1, further comprising a screen, separate from the user interface, configured to display a listing of the recorded broadcast programs.

4. The system of claim 3, wherein the user interface and the screen are included in a vehicle, and the screen is to display the listing of recorded programs only to passengers of the vehicle while the vehicle is in motion or to occupants of the vehicle when the vehicle is in park.

5. The system of claim 3, wherein the activations of the first button, the second button, the third button, and the fourth button cause the broadcast program recording and playback device to scan through recorded broadcast programs separately from the listing of the recorded broadcast programs displayed on the screen.

6. The system of claim 1, wherein the user interface is included in a mobile communication device.

7. The system of claim 1, wherein the user interface further includes a plurality of additional buttons to cause the broadcast program recording and playback device to scan through recorded broadcast programs for a plurality of respective additional preset broadcast stations.

8. The system of claim 1, wherein the multiple activations include physical contact from a user.

9. The system of claim 1, wherein the multiple activations include voice activation by a user.

* * * * *